US011133006B2

(12) United States Patent
Pedemonte et al.

(10) Patent No.: US 11,133,006 B2
(45) Date of Patent: Sep. 28, 2021

(54) ENHANCING TEST COVERAGE OF DIALOGUE MODELS

(71) Applicant: International Business Machines Corporation, Armonk, NY (US)

(72) Inventors: Pablo Jesus Pedemonte, Buenos Aires (AR); Christian Muise, Somerville, MA (US); Marco Patricio Crasso, Buenos Aires (AR); Zhongshen Zeng, Cambridge, MA (US); Yasaman Khazaeni, Brighton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 247 days.

(21) Appl. No.: 16/516,960

(22) Filed: Jul. 19, 2019

(65) Prior Publication Data

US 2021/0020172 A1    Jan. 21, 2021

(51) Int. Cl.
  *G10L 15/22* (2006.01)
  *G10L 15/193* (2013.01)
  *G06F 40/56* (2020.01)
  *G06F 40/289* (2020.01)

(52) U.S. Cl.
  CPC ............ *G10L 15/22* (2013.01); *G06F 40/289* (2020.01); *G06F 40/56* (2020.01); *G10L 15/193* (2013.01)

(58) Field of Classification Search
  CPC ..... G10L 15/193; G10L 15/22; G06F 40/289; G06F 40/56
  See application file for complete search history.

(56) References Cited

U.S. PATENT DOCUMENTS

| 5,692,122 A | 11/1997 | Bird |
| 8,296,144 B2 | 10/2012 | Weng et al. |
| 8,949,122 B2 | 2/2015 | Leite et al. |

(Continued)

OTHER PUBLICATIONS

Chen, P., "A use case driven object-oriented design methodology for the design of multi-level workflow schemas", 2000, Available from ProQuest Dissertations and Theses Professional. (Year: 2000).*

(Continued)

*Primary Examiner* — Eric Yen
(74) *Attorney, Agent, or Firm* — Amin, Turocy & Watson, LLP

(57) ABSTRACT

In one or more embodiments described herein, device, computer-implemented methods, and/or computer program products that facilitate enhancing test coverage of dialogue models. According to an embodiment, a system can comprise a processor that executes computer executable components stored in memory. The computer executable components can comprise a conversation processing component that receives and processes a first conversation. The computer executable components can further comprise a node marking component that tags a first node of a node map as an accessed node if the first node was accessed during processing of the first conversation. The computer executable components can further comprise a reporting component that generates a report comprising a list of nodes, wherein the list of nodes comprises one or more second nodes that were not accessed during processing of the first conversation.

20 Claims, 11 Drawing Sheets

(56) References Cited

U.S. PATENT DOCUMENTS

| | | | |
|---|---|---|---|
| 9,247,054 B2 | 1/2016 | Sharma | |
| 9,883,026 B2 | 1/2018 | Aldecoa et al. | |
| 10,219,122 B1* | 2/2019 | Scanlon | H04W 4/14 |
| 10,360,912 B1* | 7/2019 | Jones | G16H 80/00 |
| 10,963,493 B1* | 3/2021 | Hu | G06N 3/08 |
| 2003/0079039 A1* | 4/2003 | Forkner | H04L 67/02 |
| | | | 709/237 |
| 2004/0249637 A1* | 12/2004 | Baker | G10L 15/1822 |
| | | | 704/239 |
| 2005/0080629 A1* | 4/2005 | Attwater | G10L 15/22 |
| | | | 704/275 |
| 2005/0144315 A1* | 6/2005 | George | H04L 67/02 |
| | | | 709/238 |
| 2007/0150274 A1* | 6/2007 | Fujimoto | G10L 15/20 |
| | | | 704/233 |
| 2007/0198272 A1* | 8/2007 | Horioka | H04M 3/493 |
| | | | 704/275 |
| 2007/0239458 A1* | 10/2007 | Odell | G10L 15/26 |
| | | | 704/275 |
| 2007/0250882 A1 | 10/2007 | Da Palma et al. | |
| 2008/0201135 A1* | 8/2008 | Yano | G10L 15/1822 |
| | | | 704/201 |
| 2011/0321008 A1* | 12/2011 | Jhoney | G06F 9/451 |
| | | | 717/114 |
| 2012/0089394 A1* | 4/2012 | Teodosiu | G06F 40/30 |
| | | | 704/235 |
| 2012/0173243 A1* | 7/2012 | Anand | G06F 40/40 |
| | | | 704/270.1 |
| 2014/0006319 A1* | 1/2014 | Anand | G06N 5/02 |
| | | | 706/12 |
| 2017/0228366 A1* | 8/2017 | Bui | G06F 40/247 |
| 2017/0270929 A1* | 9/2017 | Aleksic | G06F 40/295 |
| 2017/0337036 A1* | 11/2017 | Fujii | G06F 40/35 |
| 2018/0052664 A1* | 2/2018 | Zhang | G06F 16/90332 |
| 2019/0166069 A1* | 5/2019 | Yao | G06F 3/0486 |
| 2019/0251965 A1* | 8/2019 | Dharne | G06F 3/167 |
| 2019/0286698 A1* | 9/2019 | Gupta | G06F 40/35 |
| 2019/0324780 A1* | 10/2019 | Zhu | G06F 16/176 |
| 2019/0341039 A1* | 11/2019 | Bharadwaj | G06F 40/216 |
| 2020/0034430 A1* | 1/2020 | Hoshino | G06F 40/30 |
| 2020/0110915 A1* | 4/2020 | Long | G06N 3/088 |
| 2020/0175971 A1* | 6/2020 | Arora | G10L 13/00 |

OTHER PUBLICATIONS

Wei Wei, Quoc Le, Andrew Dai, Jia Li, "AirDialogue: An Environment for Goal-Oriented Dialogue Research", Oct.-Nov. 2018, Association for Computational Linguistics, Proceedings of the 2018 Conference on Empirical Methods in Natural Language Processing, pp. 3844-3854 (Year: 2018).*

Vasconcelos et al. "Bottester: Testing Conversational Systems with Simulated Users", 5 pages.

Babkin et al., "Bootstrapping Chatbots for Novel Domains", Workshop at NIPS on Learning with Limited Labeled Data (LLD), Dec. 2017, 7 pages.

* cited by examiner

ENHANCING TEST COVERAGE OF DIALOGUE MODELS

BACKGROUND

The subject disclosure relates generally to measuring and enhancing test coverage of dialogue models, and more particularly, to systems, computer-implemented methods, and computer program products that facilitate identifying and modifying conversation paths to enhance test coverage of dialogue models.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate enhancing coverage of dialogue models.

According to an embodiment, a system comprises a memory that stores computer executable components and a processor that executes the computer executable components stored in the memory. A conversation processing component receives and processes a first conversation. A node marking component tags a first node of a node map as an accessed node if the first node was accessed during processing of the first conversation. A reporting component generates a report comprising a list of nodes, wherein the list of nodes comprises one or more second nodes that were not accessed during processing of the first conversation.

According to another embodiment, a computer-implemented method comprises receiving and processing, by a conversation processing component operatively coupled to a processor, a first conversation. A node marking component operatively coupled to the processor, tags a first node as an accessed node if the first node was accessed during processing of the first conversation. A reporting component operatively coupled to the processor, generates by a report comprising a list of nodes, wherein the list of nodes comprises one or more second nodes that were not accessed during processing of the first conversation.

According to another embodiment, a computer program product enhances test coverage of dialogue models, the computer program product comprises a computer readable storage medium having program instructions embodied therewith, the program instructions are executable by a processor to cause the processor to receive and process, by the processor, a first conversation; tag, by the processor, a first node as an accessed node if the first node was accessed during processing of the first conversation; and generate, by the processor, a report comprising a list of nodes, wherein the list of nodes comprises one or more second nodes that were not accessed during processing of the first conversation.

DETAILED DESCRIPTION

Figure 1:
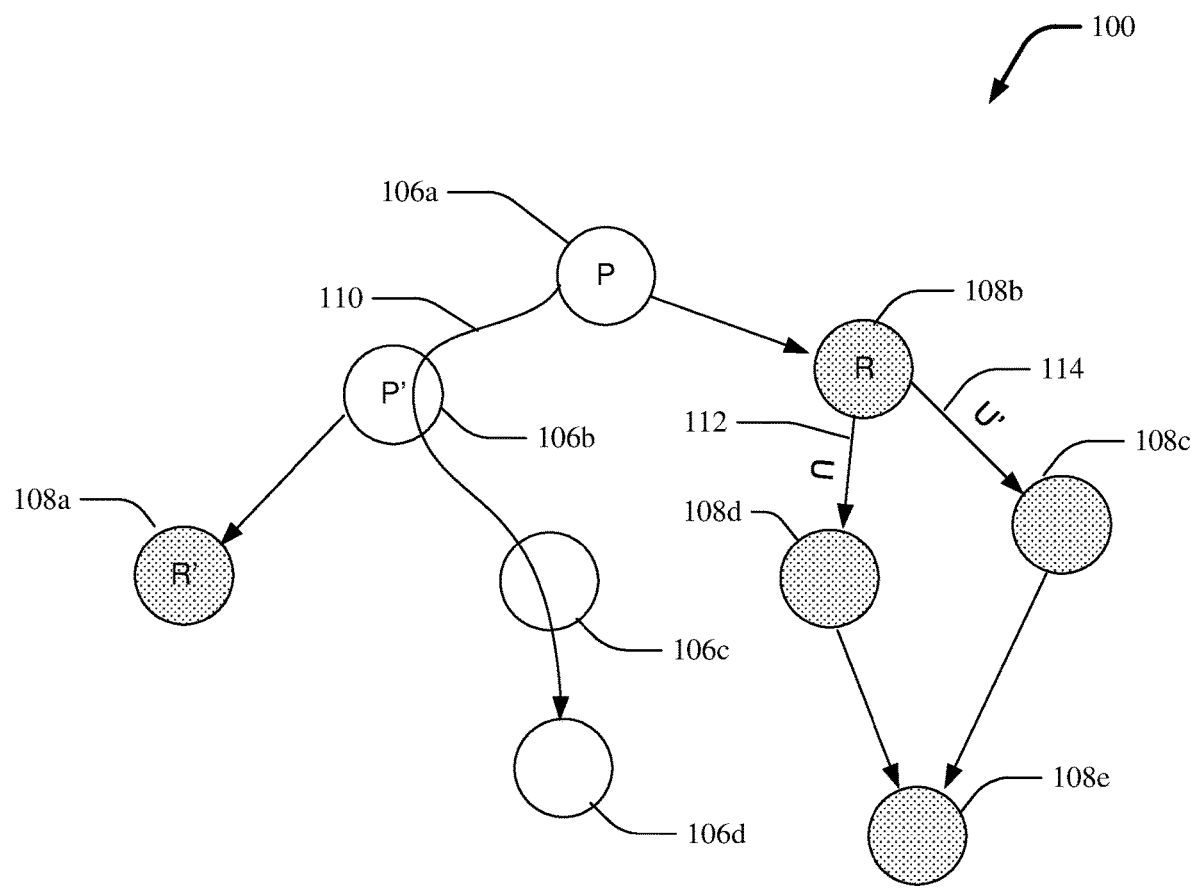
FIG. 1 illustrates an example of model node graph in accordance with one or more embodiments described herein.

The following detailed description is merely illustrative and is not intended to limit embodiments and/or applications or uses of embodiments. Furthermore, there is no intention to be bound by any expressed or implied information presented in the preceding Summary section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

According to one or more non-limiting embodiment(s), a system is described herein that processes one or more conversations to enhance test coverage of dialogue models used in chat systems. In some embodiments, a conversational agent creates a node graph (also referred to as "model graph") that comprises nodes and edges (e.g., described below in connection with FIG. 1) used for testing various automated chat systems. The nodes and edges represent interaction between two entities. The node graph and a conversation suite are provided to a system for measuring and enhancing conversation dialogue models of automated chat systems. A conversation suite (also referred to as "conversation") comprises a group of interactions between a first entity (e.g., an agent) and a second entity (e.g., an end-user). An interaction can be a textual and/or an audible exchange of sentences between the two entities, wherein a sentence can be a group of words (e.g., "are you okay?") and/or a sentence can be a single word (e.g., "yes," a response to "are you okay?").

In some embodiments, a node graph is provided to a system, and a report is generated. The report comprises a node map having one or more node paths that can identify one or more nodes accessed (e.g., visited nodes) upon processing a conversation. The report can also identify one or more nodes that were not accessed (e.g., node map of un-visited nodes) upon processing the conversation. A report can be generated that provides information associated with accessed nodes and sentences of a conversation that caused the nodes to be accessed. Analyzing information associated with accessed nodes can provide a better understanding of how an interaction was successful in accessing one or more nodes. This analysis can aid a system in providing enhanced test coverage of dialogue models used in a chat system.

A test conversation can be generated that comprises one or more preselected interaction between two entities (e.g., an agent and an end user), wherein the interactions may be a combination of textual sentences (e.g., textual input) and audio utterances (e.g., audio input). The sentence is provided to the system (e.g., a conversation processing module 202 described below in connection with FIG. 2). Upon processing of the sentence, a conversation path can be generated (e.g., part of the report). The conversation path may be a set of nodes that were accessed during processing of a sentence. A report is generated after the sentence is processed, wherein the report comprises a node path. The node path provides information about accessed nodes, including node connection information (e.g., which nodes are connected) and relationships between nodes (e.g., how the nodes are connected). The report also comprises one or more sentences associated with a node path. If a report is not generated (e.g., because none of the nodes were accessed), then an indication is provided evincing that the tested sentence may not be valid and may be removed or replaced from the test conversation. When no other node is accessed upon processing sentences of an interaction, a final node in a path is reached for that interaction. Upon processing of sentences of a conversation, a report indicating accessed nodes and the un-accessed nodes is generated. The report can be analyzed by a system to enhance a conversation by recommending one or more sentences that, when processed, would have high probability of accessing one or more un-accessed nodes. After further processing of recommended sentences, a final report indicating a final coverage of node graph is generated. The recommended sentences may be dynamically added, removed or replaced in order to provide a new conversation with least number of sentences that can access greatest number of nodes as possible (e.g., over 90% of nodes accessed).

FIG. 1 illustrates an example of a model node graph 100 in accordance with one or more embodiments described herein. Repetitive description of like elements employed in respective embodiments is omitted for sake of brevity. The model node graph 100 comprises one or more nodes (e.g. 106a-d and 108a-e). These nodes are generated by a conversation agent for testing a chat system. The model node graph 100 is stored in memory (e.g., memory 204 of FIG. 2 described below). Upon processing of the interaction, a node path 110 is created identifying nodes accessed (e.g., 106a-d). The model node graph 100 can also provide one or more nodes (e.g., nodes 108a-e) that were not accessed (e.g., un-accessed or un-visited nodes) by sentences of the test conversation.

The report is generated showing relationship between accessed nodes 106a-d. Using this relationship, additional sentences may be recommended for accessing un-accessed nodes (e.g., 108a-e). For example, node 106a (e.g., P node) can be a parent node of nodes 108a (e.g., R' node) and 108b (e.g., R node); the node 108b (e.g., node R) can be a root node for nodes not accessed (e.g., nodes 108c, 108d, and 108e); and path U 112 and path U' 114 can be sentences or responses that could allow access to nodes 108d and node 108c, respectively. A "yes" or "no" response at P node 106a can for example lead to node R 108b. In such instance, a sentence that would cause access to node 108b is recommended.

Figure 2:
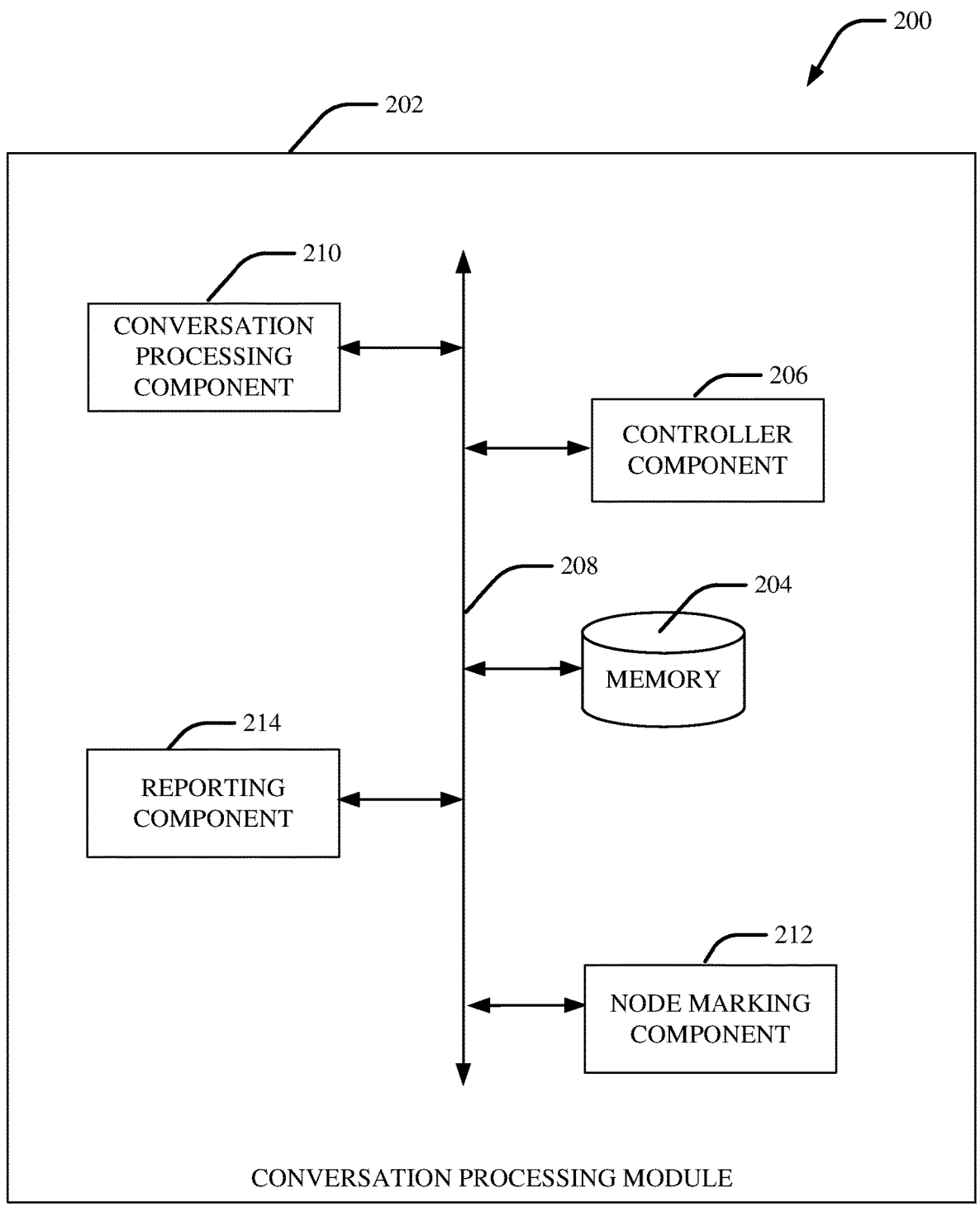
FIG. 2 illustrates a block diagram of an example, non-limiting system that facilitates operation of conversation processing module components in accordance with one or more embodiments described herein.

FIG. 2 illustrates a block diagram of an example, non-limiting system 200 that facilitates operation of a conversation processing module 202 in accordance with one or more embodiments described herein. The conversation processing module 202 can also include or otherwise be associated with memory 204 and controller component 206 (also referred to as a "processor") that executes computer executable components stored in the memory 204. The conversation processing module 202 can further include a system bus 208 that can couple various components including, but not limited to, a conversation processing component 210, a node marking component 212 and a reporting component 214.

Aspects of systems (e.g., the conversation processing module 202 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

It should be appreciated that the embodiments of the subject disclosure depicted in various figures disclosed herein are for illustration only, and as such, the architecture of such embodiments are not limited to the systems, devices, and/or components depicted therein. For example, in some embodiments, the conversation processing module 202 can comprise various computer and/or computing-based elements described herein with reference to operating environment 1100 and FIG. 11. Such computer and/or computing-based elements can be used in connection with implementing one or more of the systems, devices, and/or components shown and described in connection with FIG. 2 or other figures disclosed herein.

The memory 204 can store one or more computer and/or machine readable, writable, and/or executable components and/or instructions that, when executed by controller component 206, can facilitate performance of operations defined by the executable component(s) and/or instruction(s). For example, the memory 204 can store computer and/or machine readable, writable, and/or executable components and/or instructions that, when executed by the controller component 206, can facilitate execution of the various functions described herein relating to the conversation processing component 210, the node marking component 212 and the reporting component 214.

The memory 204 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 204 are described below with reference to system memory 1116 and FIG. 11. Such examples of memory 204 can be employed to implement any embodiments of the subject disclosure.

The controller component 206 can comprise one or more types of processors and/or electronic circuitry that can implement one or more computer and/or machine readable, writable, and/or executable components and/or instructions that can be stored on the memory 204. For example, the controller component 206 can perform various operations that can be specified by such computer and/or machine readable, writable, and/or executable components and/or instructions including, but not limited to, logic, control, input/output (I/O), arithmetic, and/or the like. In some embodiments, controller component 206 can comprise one or more central processing unit, multi-core processor, microprocessor, dual microprocessors, microcontroller, System on a Chip (SOC), array processor, vector processor, and/or another type of processor.

The components of conversation processing module 202, for example, the controller component 206, the memory 204, the conversation processing component 210, the node marking component 212 and the reporting component 214 can be communicatively, electrically, and/or operatively coupled to one another via the system bus 208 to perform functions of the conversation processing module 202, and/or any components coupled therewith. The system bus 208 can comprise one or more memory bus, memory controller, peripheral bus, external bus, local bus, and/or another type of bus that can employ various bus architectures. Further examples of the system bus 208 are described below with reference to a system bus 1118 and FIG. 11. Such examples of system bus 208 can be employed to implement any embodiments of the subject disclosure.

The conversation processing module 202 can comprise one or more computer and/or machine readable, writable, and/or executable components and/or instructions that, when executed by the controller component 206, can facilitate performance of operations defined by such component(s) and/or instruction(s). Further, in numerous embodiments, any component associated with the conversation processing module 202, as described herein with or without reference to the various figures of the subject disclosure, can comprise one or more computer and/or machine readable, writable, and/or executable components and/or instructions that, when executed by the controller component 206, can facilitate performance of operations defined by such component(s) and/or instruction(s). For example, the conversation processing component 210, the node marking component 212, the reporting component 214, and/or any other components associated with the conversation processing module 202 (e.g., communicatively, electronically, and/or operatively coupled with and/or employed by conversation processing module 202), can comprise such computer and/or machine readable, writable, and/or executable component(s) and/or instruction(s). Consequently, the conversation processing module 202 and/or any components associated therewith, can employ the controller component 206 to execute such computer and/or machine readable, writable, and/or executable component(s) and/or instruction(s) to facilitate performance of one or more operations described herein with reference to the conversation processing module 202 and/or any such components associated therewith.

The conversation processing module 202 can facilitate performance of operations related to and/or executed by the components of conversation processing module 202, for example, the controller component 206, the memory 204, the conversation processing component 210, the node marking component 212 and the reporting component 214. For example, as described in detail below, the conversation processing module 202 can facilitate: receiving and processing, by the conversation processing component 210, a first conversation; tagging, by the node marking component 212, a first node as an accessed node if the first node was accessed during processing of the first conversation; and generating, by the reporting component 214, a report comprising a list of nodes, wherein the list of nodes comprises one or more second nodes that were not accessed during processing of the first conversation.

Conversation processing component 210 can comprise, but is not limited to, an audio processor, a textual input processor, one or more system processors, memory, and electrical circuitry. In some embodiments, the conversation processing component 210 receives a conversation that comprises one or more interactions. A single interaction comprises one or more textual sentences and/or audio inputs (e.g., a sentence in audio format) that represent an exchange of communication between an agent and end-user. Other forms of communication, for example, but not limited to, gestures and video input may be part of the conversation. Conversation processing component 210 processes each sentence of the conversation. For example, a node in the node graph is identified as been provided by the agent and an edge (e.g., path leading to another node) is identified as response provided by the end-user. In some embodiments, with a relevant response, a child node can be accessed. A node at the highest level is identified at start of the conversation processing. Thereafter, additional child nodes and edges may be identified as a result of processing each sentence and/or responses of the interaction.

The node marking component 212 can comprise, but not limited to, one or more processors, memory, and electrical. In some embodiments, the node marking component 212 tags (e.g., marks or sets a flag associated with a node to true) each node of the node graph if the node was accessed during processing of the conversation, thereby generating a node map comprising one or more accessed nodes. As the conversation processing component 210 continues to process more sentences and responses of the interactions, additional nodes may be accessed. The node marking component 212 continues to mark each node as the node is accessed (e.g., the sentence matched with sentence associated with node). The node marking component 212 can also keep track of the connection and relationship between each accessed node. The node marking component 212 can mark each node of the node graph as the node is accessed by the conversation processing component 210 and tracks the path (e.g., 110 of FIG. 1) from the root node to all the nodes accessed during processing.

The reporting component 214 can comprise, but is not limited to, one or more processors, memory, and electrical. The reporting component 214 can generate the report comprising a list of nodes, a first group of nodes can be nodes that were accessed during processing of the conversation and the second group of nodes can be nodes that were not accessed during processing of the conversations. The report is utilized by the various components of the conversation processing module 202 to recommend new sentences based on information collected regarding the accessed nodes and un-accessed nodes. The report can comprise information about the nodes that were accessed and sentences that did or did not cause the node to be accessed. In some embodiments, the report comprising accessed nodes, paths and un-accessed nodes is generated upon completion of processing the conversation. The new sentences can also be processed by the conversation processing component 210, whereby the report can be updated.

Figure 3:
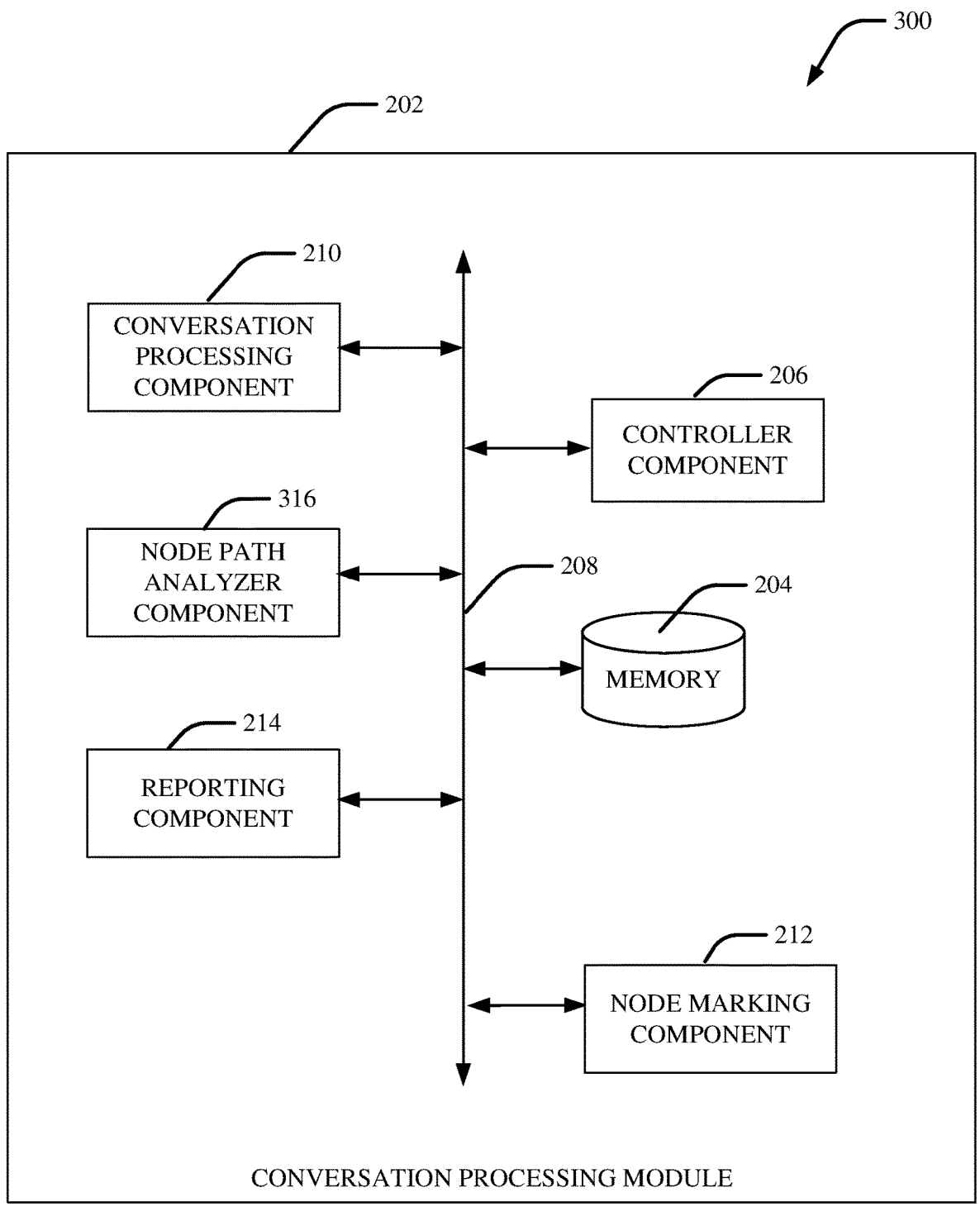
FIG. 3 illustrates a block diagram of an example, non-limiting system that facilitates operation of conversation processing module components in accordance with one or more embodiments described herein.

FIG. 3 illustrates a block diagram of an example, non-limiting system 300 that facilitates operation of the conversation processing module 202 components in accordance with one or more embodiments described herein. The system 300 can comprise conversation processing module 202. In some embodiments, conversation processing module 202 can further comprise a node path analyzer component 316.

The node path analyzer component 316 can comprise, but is not limited to, one or more processors, memory, and electrical modules. The node path analyzer component 316 can generate an analysis of the one or more paths created by the second nodes (e.g., un-accessed nodes). The node path analyzer component 316 receives a report generated by the reporting component 214. The node path analyzer component 316 starts with a root node and identifies the root node for one or more un-accessed nodes. The node path analyzer component 316 analyzes the accessed node to determine which sentence and response allowed a given node to be accessed. A path from one node to another node can be analyzed to determine if an alternate response to the sentence would create a new path, one that would lead to accessing one or more of the un-accessed nodes. For example, if the response (e.g., a word or a sentence) at a given node was "yes" that created a path to a child node, then a "no" response may create path to an un-accessed node. The node path analyzer component 316 analyzes responses at each node to determine if missing responses could create a new path to the un-accessed nodes. The node path analyzer component 316 generates a detailed analysis comprising node information connection information and relationships between nodes, sentences that caused the system to access nodes. The detailed analysis can be accessed by other components of conversation processing modules to generate alternate interactions.

Figure 4:
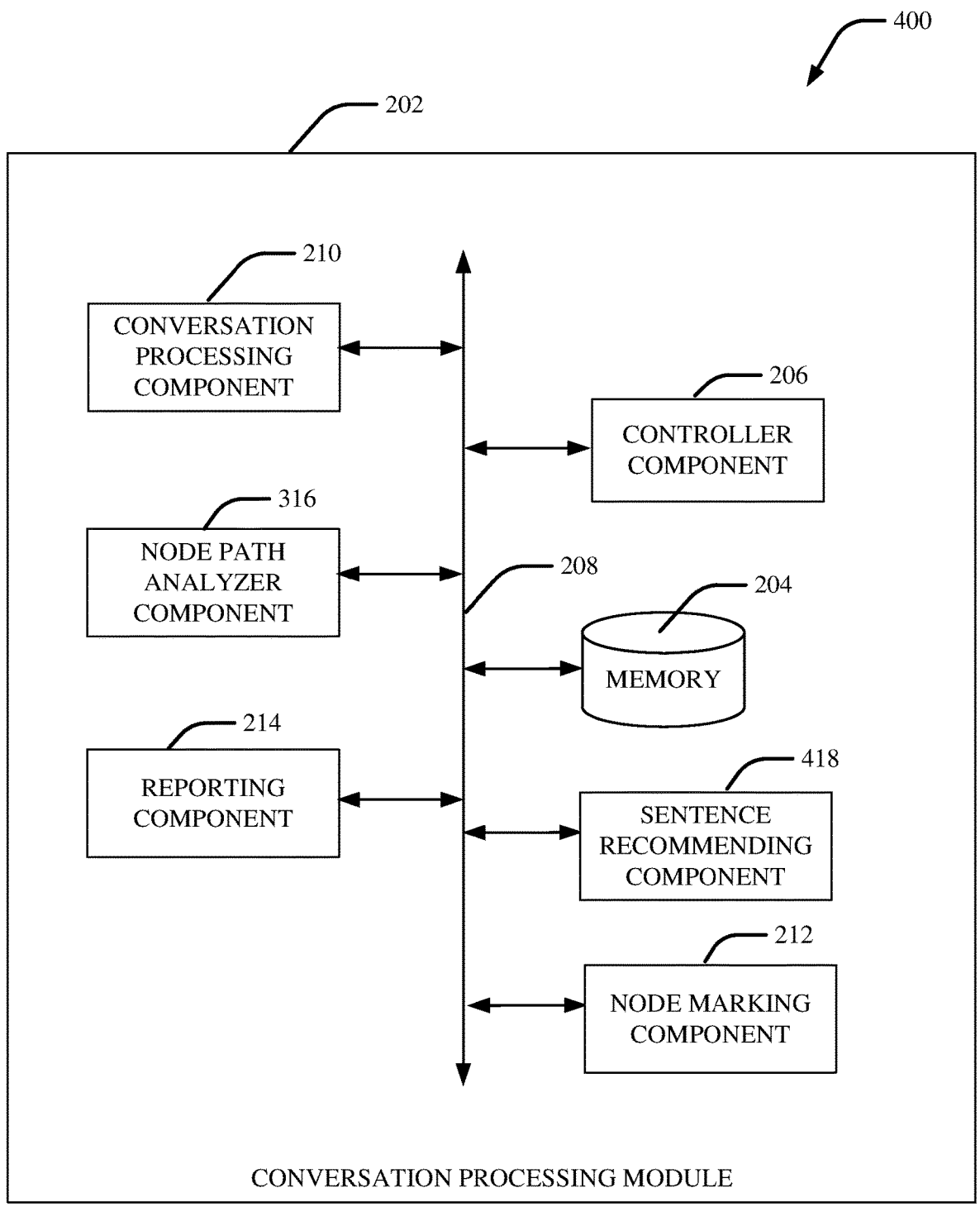
FIG. 4 illustrates a block diagram of an example, non-limiting system that facilitates operation of conversation processing module components in accordance with one or more embodiments described herein.

FIG. 4 illustrates a block diagram of an example, non-limiting system 400 that facilitates operation of the conversation processing module 202 components in accordance with one or more embodiments described herein. The system 400 can comprise conversation processing module 202, which can further comprise a sentence recommending component 418.

The sentence recommending component 418 can comprise, but is not limited to, one or more processors, memory, and electrical modules. The sentence recommending component 418 can generate a first sentence (e.g., an additional sentence comprising one or more words) based on connection relationships of a first node, the one or more second nodes and one or more paths created by previous one or more sentences. The sentence recommending component 418 can evaluate the report generated by reporting component 214 and the analysis generated by node path analyzer component 316 to generate recommendations one or more sentences that would access one of the un-accessed nodes. The sentence or a response is generated based on how the accessed nodes are connected and their relationship (e.g., responses to sentences at one of the accessed nodes). For example, a sentence that generates a "no" response may be recommended upon the system concluding that a given node was not accessed because the conversation did not include a sentence that produced a "no" response. After each accessed node connection and relationship is evaluated, several alternate sentences can be recommended for inclusion into the conversation to increase number of nodes accessed. An advantage is that the system allows for least amount of interaction that accesses greatest number of nodes of a given model graph.

Figure 5:
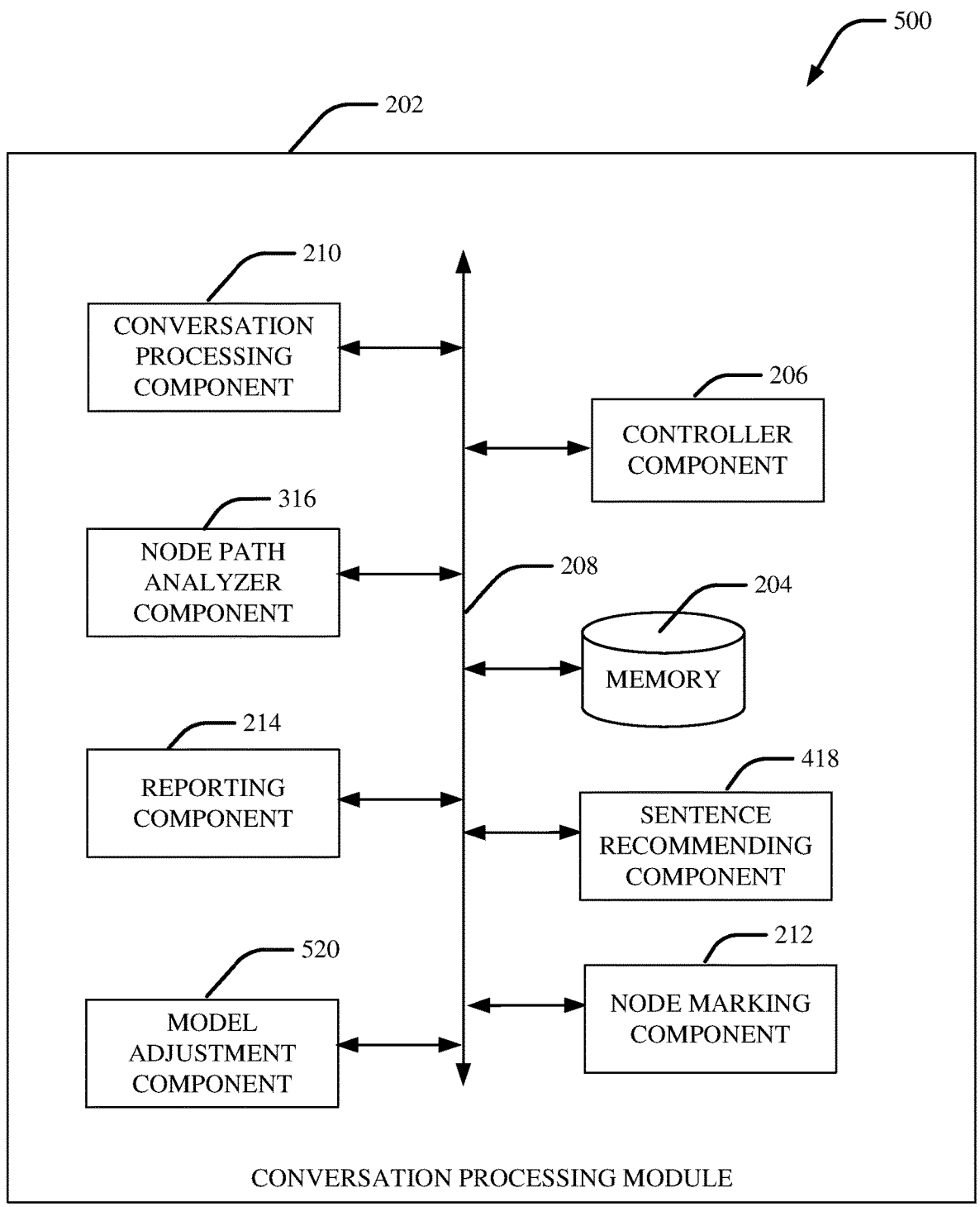
FIG. 5 illustrates a block diagram of an example, non-limiting system that facilitates operation of conversation processing module components in accordance with one or more embodiments described herein.

FIG. 5 illustrates a block diagram of an example, non-limiting system 400 that facilitates operation of the conversation processing module 202 components in accordance with one or more embodiments described herein. According to one or more embodiments, the system 400 can comprise the conversation processing module 202, which can further comprise a model adjustment component 520.

The model adjustment component 520 can comprise, but is not limited to, one or more processors, memory, and electrical modules. The model adjustment component 520 can provide an indication that a conversation processing model requires an adjustment if none of the nodes of the node graph were accessed or only a small percentage (e.g., below 10%) of nodes were accessed after processing the conversation. The model adjustment component 520 can also incorporate the recommended sentences into an original conversation to create an updated conversation. The model adjustment component 520 can provide an alternate conversation (e.g., a modified conversation suite or an enhanced dialogue model) if none or large percentage (e.g., over 90%) of nodes were not accessed during conversation processing.

Figure 6:
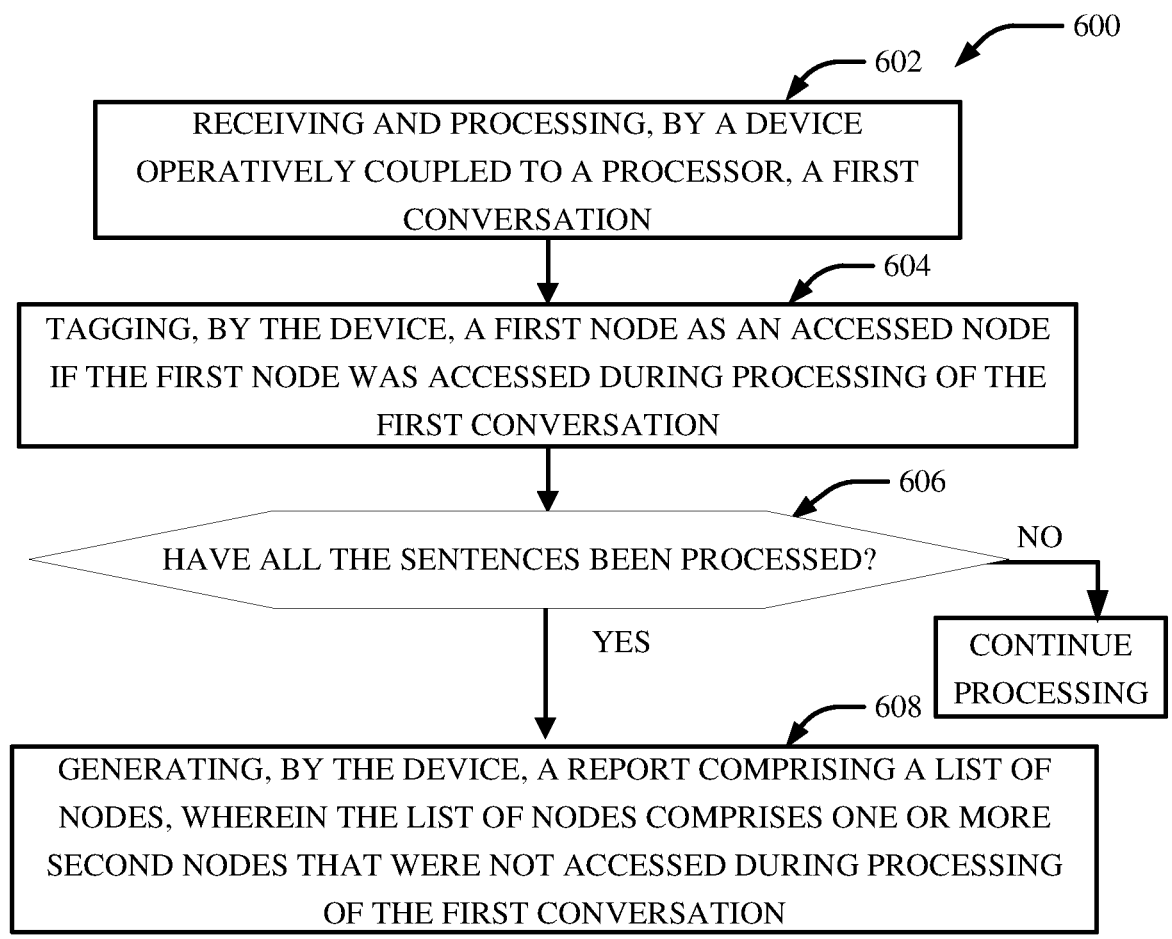
FIG. 6 depicts a diagram of an example, non-limiting computer implemented method that facilitates using conversation processing modules accordance with one or more embodiments describe herein.

FIG. 6 depicts a diagram of an example, non-limiting computer implemented method that facilitates using the conversation processing module 202 accordance with one or more embodiments describe herein. In some examples, flow diagram 600 can be implemented by operating environment 1100 described below. It can be appreciated that the operations of flow diagram 600 can be implemented in different order than is depicted.

In non-limiting example embodiments, a computing device (or system) (e.g., computer 1112) is provided, the device or system comprising one or more processors and one or more memories that stores executable instructions that, when executed by the one or more processors, can facilitate performance of the operations as described herein, including the non-limiting methods as illustrated in the flow diagram of FIG. 6.

Operation 602 depicts receiving and processing, by a device (e.g., the conversation processing component 210) operatively coupled to a processor (e.g., controller component 206), a first conversation. Operation 604 depicts tagging, by the device (e.g., the node marking component 212), a first node as an accessed node if the first node was accessed during processing of the first conversation. Operation 606 depicts determining, by the processor 206, if all the sentences of conversation suite have been processed, then perform operation 608. Otherwise, continue processing the sentences. Operation 608 depicts generating, by the device (e.g., the reporting component 214), a report comprising a list of nodes, wherein the list of nodes comprises one or more second nodes that were not accessed during processing of the first conversation.

Figure 7:
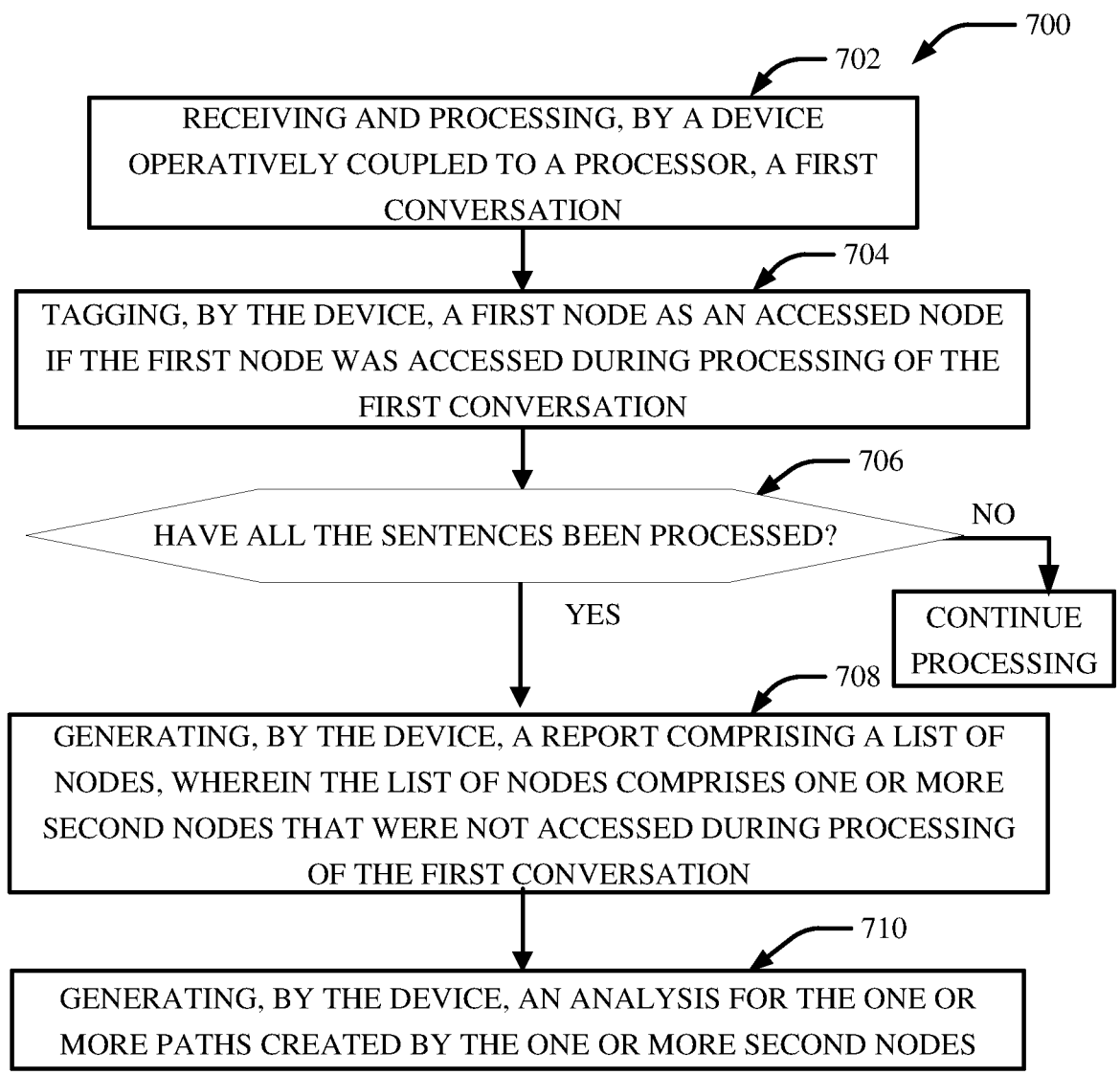
FIG. 7 depicts a diagram of an example, non-limiting computer implemented method that facilitates using conversation processing modules accordance with one or more embodiments describe herein.

FIG. 7 depicts a diagram of an example, non-limiting computer implemented method that facilitates using the conversation processing module 202 accordance with one or more embodiments describe herein. In some examples, flow diagram 700 can be implemented by operating environment 1100 described below. It can be appreciated that the operations of flow diagram 700 can be implemented in a different order than is depicted.

In non-limiting example embodiments, a computing device (or system) (e.g., computer 1112) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts receiving and processing, by a device (e.g., the conversation processing component 210) operatively coupled to a processor (e.g., controller component 206), a first conversation. Operation 704 depicts tagging, by the device (e.g., the node marking component 212), a first node as an accessed node if the first node was accessed during processing of the first conversation. Operation 706 depicts determining, by the processor 206, if all the sentences of conversation suite have been processed, then perform operation 708. Otherwise, continue processing the sentences. Operation 708 depicts generating, by the device (e.g., the reporting component 214), a report comprising a list of nodes, wherein the list of nodes comprises one or more second nodes that were not accessed during processing of the first conversation. Operation 710 depicts generating, by the device (e.g., the node path analyzer component 316), an analysis for the one or more paths created by the one or more second nodes.

Figure 8:
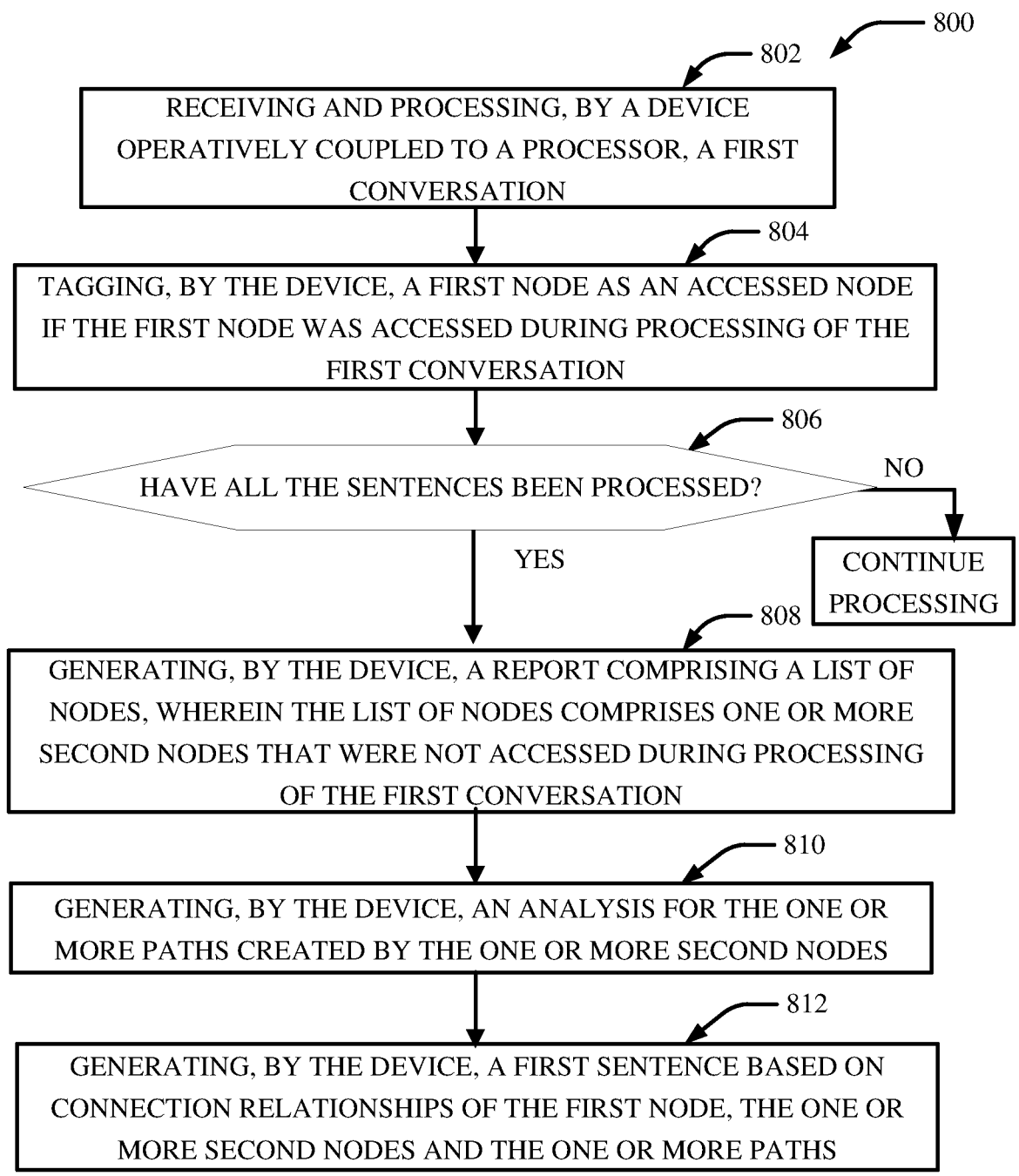
FIG. 8 depicts a diagram of an example, non-limiting computer implemented method that facilitates using conversation processing modules accordance with one or more embodiments describe herein.

FIG. 8 depicts a diagram of an example, non-limiting computer implemented method that facilitates using the conversation processing module 202 accordance with one or more embodiments describe herein. In some examples, flow diagram 800 can be implemented by operating environment 1100 described below. It can be appreciated that the operations of flow diagram 800 can be implemented in a different order than is depicted.

In non-limiting example embodiments, a computing device (or system) (e.g., computer 1112) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts receiving and processing, by a device (e.g., the conversation processing component 210) operatively coupled to a processor (e.g., controller component 206), a first conversation. Operation 804 depicts tagging, by the device (e.g., the node marking component 212), a first node as an accessed node if the first node was accessed during processing of the first conversation. Operation 806 depicts determining, by the processor 206, if all the sentences of conversation suite have been processed, then perform operation 808. Otherwise, continue processing the sentences. Operation 808 depicts generating, by the device (e.g., the reporting component 214), a report comprising a list of nodes, wherein the list of nodes comprises one or more second nodes that were not accessed during processing of the first conversation. Operation 810 depicts generating, by the device (e.g., the node path analyzer component 316), an analysis for the one or more paths created by the one or more second nodes. Operation 812 depicts generating, by the device (e.g., via the sentence recommending component 418), a first sentence based on connection relationships of the first node, the one or more second nodes and the one or more paths.

Figure 9:
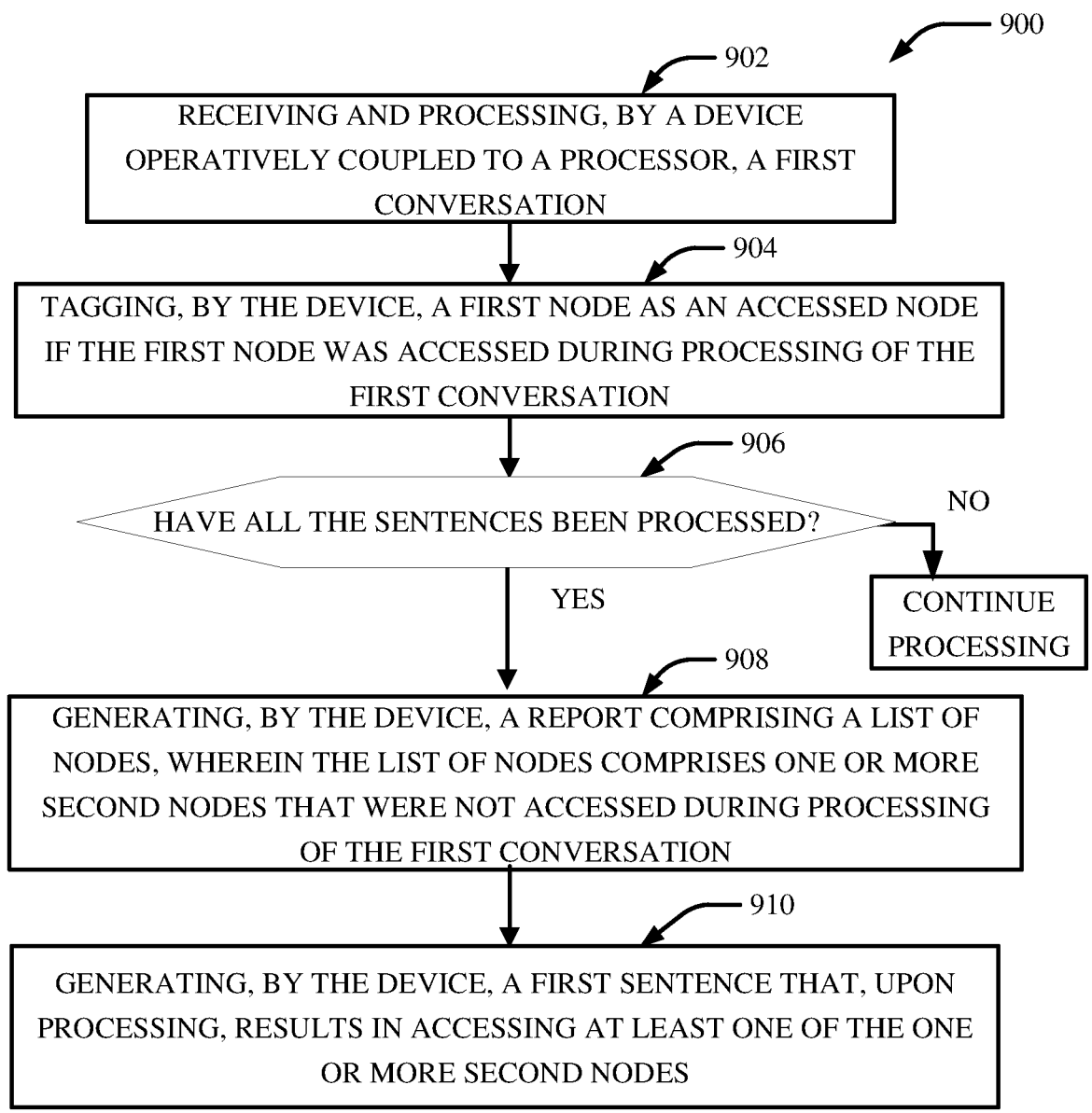
FIG. 9 depicts a diagram of an example, non-limiting computer implemented method that facilitates using conversation processing modules accordance with one or more embodiments describe herein.

FIG. 9 depicts a diagram of an example, non-limiting computer implemented method that facilitates using the conversation processing module 202 accordance with one or more embodiments describe herein. In some examples, flow diagram 900 can be implemented by operating environment 1100 described below. It can be appreciated that the operations of flow diagram 900 can be implemented in a different order than is depicted.

In non-limiting example embodiments, a computing device (or system) (e.g., computer 1112) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts receiving and processing, by a device (e.g., the conversation processing component 210) operatively coupled to a processor (e.g., controller component 206), a first conversation. Operation 904 depicts tagging, by the device (e.g., the node marking component 212), a first node as an accessed node if the first node was accessed during processing of the first conversation. Operation 906 depicts determining, by the processor 206, if all the sentences of conversation suite have been processed, then perform operation 908. Otherwise, continue processing the sentences. Operation 908 depicts generating, by the device (e.g., the reporting component 214), a report comprising a list of nodes, wherein the list of nodes comprises one or more second nodes that were not accessed during processing of the first conversation. Operation 910 depicts generating, by the device (e.g., the sentence recommending component 418), a first sentence that, upon processing, results in accessing at least one of the one or more second nodes.

Figure 10:
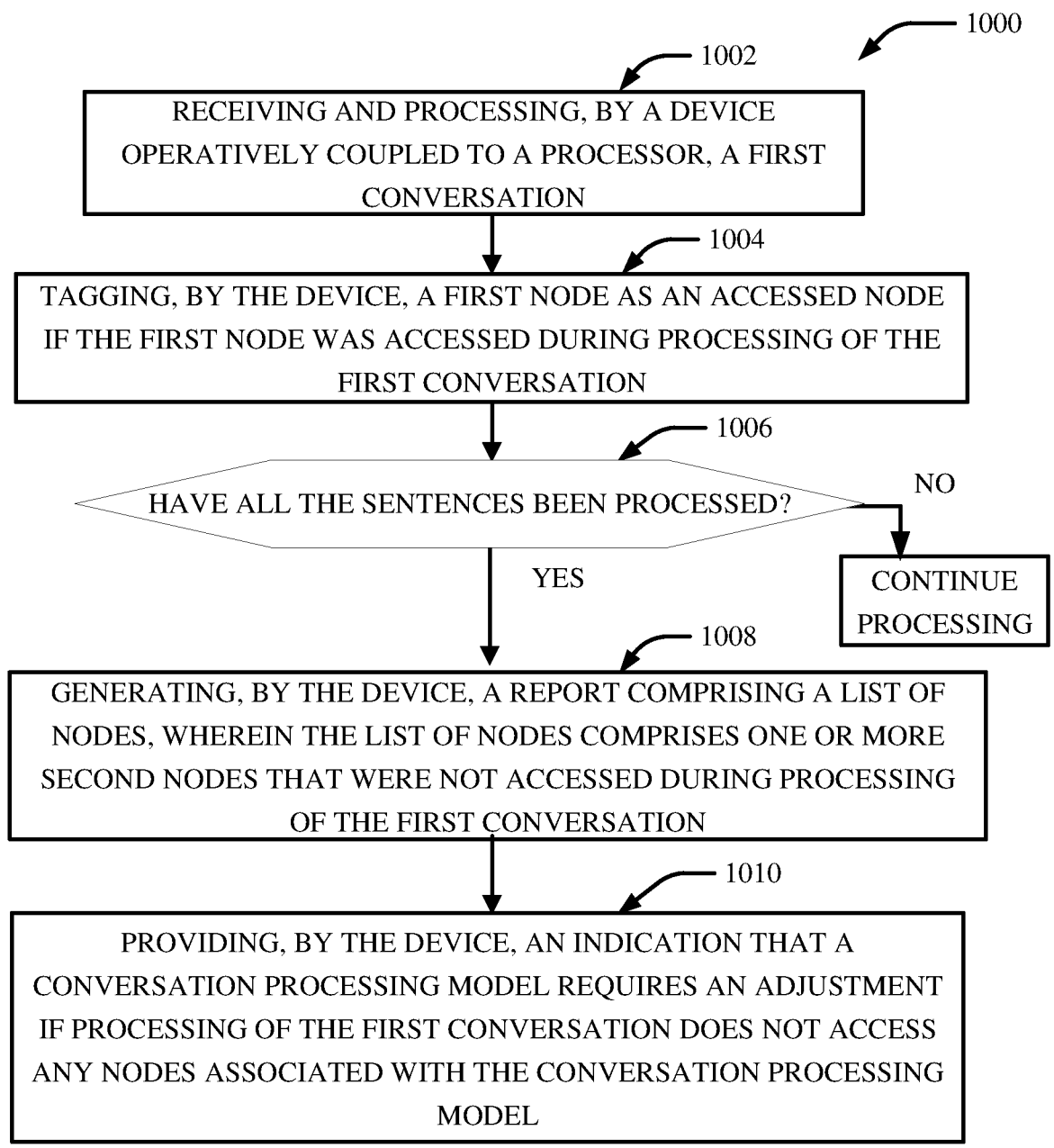
FIG. 10 depicts a diagram of an example, non-limiting computer implemented method that facilitates using conversation processing modules in accordance with one or more embodiments describe herein.

FIG. 10 depicts a diagram of an example, non-limiting computer implemented method that facilitates using the conversation processing module 202 accordance with one or more embodiments describe herein. In some examples, flow diagram 1000 can be implemented by operating environment 1100 described below. It can be appreciated that the operations of flow diagram 1000 can be implemented in a different order than is depicted.

In non-limiting example embodiments, a computing device (or system) (e.g., computer 1112) is provided, the device or system comprising one or more processors and one or more memories that stores executable instructions that, when executed by the one or more processors, can facilitate performance of the operations as described herein, including the non-limiting methods as illustrated in the flow diagrams of FIG. 10.

Operation 1002 depicts receiving and processing, by a device (e.g., the conversation processing component 210) operatively coupled to a processor (e.g., controller component 206), a first conversation. Operation 1004 depicts tagging, by the device (e.g., the node marking component 212), a first node as an accessed node if the first node was accessed during processing of the first conversation. Operation 1006 depicts determining, by the processor 206, if all the sentences of conversation suite have been processed, then perform operation 1008. Otherwise, continue processing the sentences. Operation 1008 depicts generating, by the device (e.g., the reporting component 214), a report comprising a list of nodes, wherein the list of nodes comprises one or more second nodes that were not accessed during processing of the first conversation. Operation 1010 depicts providing, by the device (e.g., the model adjustment component 520), an indication that a conversation processing model requires an adjustment if processing of the first conversation does not access any nodes associated with the conversation processing model.

Figure 11:
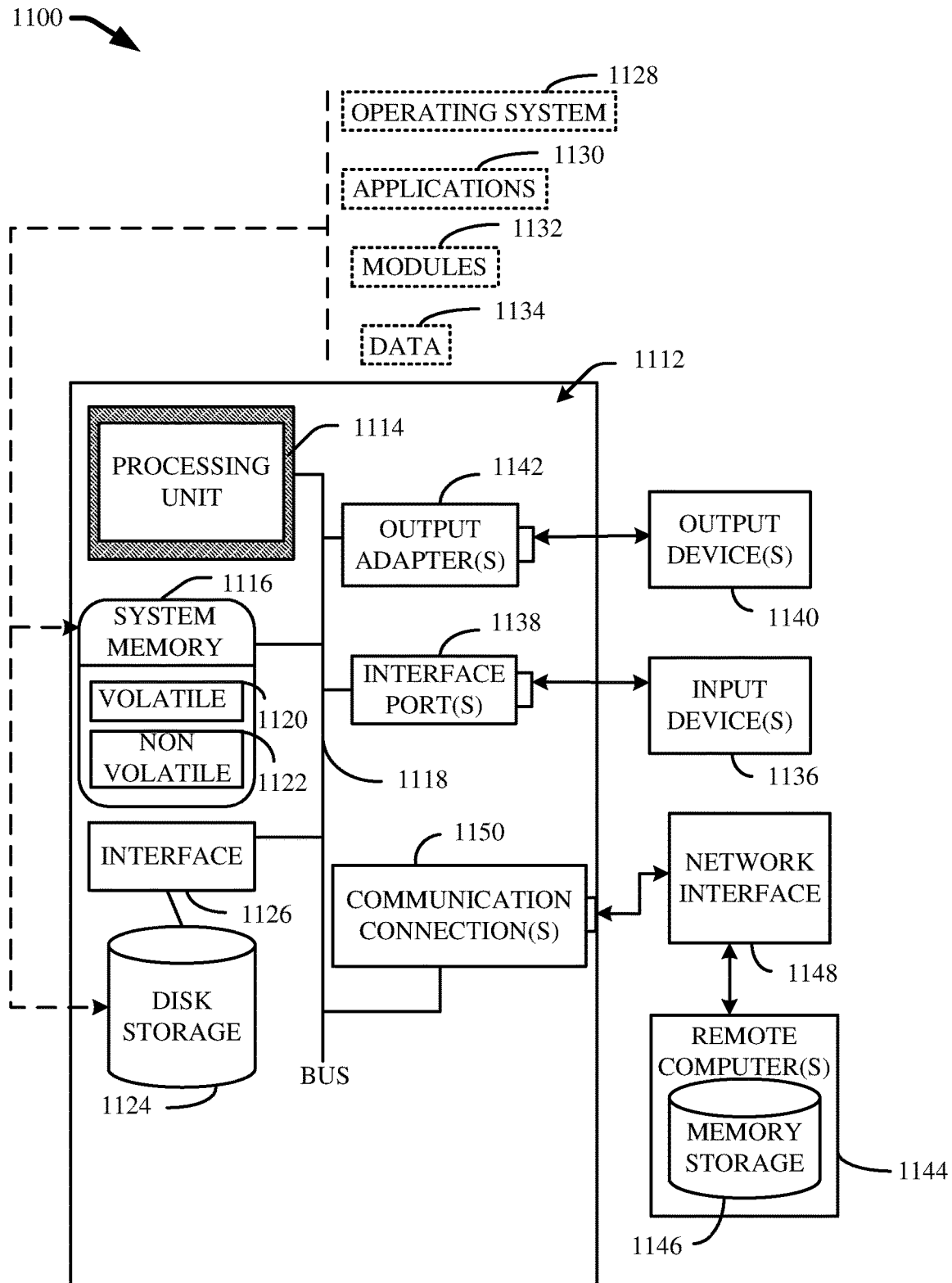
FIG. 11 illustrates a block diagram of an example, non-limiting operating environment in which one or more embodiments described herein can be facilitated.

FIG. 11 illustrates a block diagram of an example, non-limiting operating environment 1100 in which one or more embodiments described herein can be facilitated. The operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1194), and Small Computer Systems Interface (SCSI). The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 1120 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1101. Such software can also include, for example, an operating system 1128. Operating system 1128, which can be stored on disk storage 1124, acts to control and allocate resources of the computer 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor-based appliance, a peer device or other common network node and the like, and typically can also include many or all the elements described relative to computer 1112. For purposes of brevity, only a memory storage device 1146 is illustrated with remote computer(s) 1144. Remote computer(s) 1144 is logically coupled to computer 1112 through a network interface 1148 and then physically coupled via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

Embodiments of the present innovation may be a system, a method, an apparatus and/or a computer program product at any possible technical detail level of integration. The computer program product can include a computer readable storage medium (or media) having computer readable program instructions thereon for causing a processor to carry out aspects of the present innovation. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present innovation can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be coupled to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, to perform aspects of the present innovation.

Aspects of the present innovation are described herein with reference to flowchart illustrations and/or block diagrams of methods, apparatus (systems), and computer program products according to embodiments of the innovation. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present innovation. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform tasks and/or implement abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory;
a processor, operably coupled to the memory, wherein the processor:
receives and processes a first conversation;
tags a first node of a node map as an accessed node if the first node was accessed during processing of the first conversation; and
that generates a report comprising a list of nodes, wherein the list of nodes comprises one or more second nodes that were not accessed during processing of the first conversation.

2. The system of claim 1, wherein the report comprises an association of the first conversation with the list of nodes.

3. The system of claim 1, wherein the report comprises one or more paths created by the one or more second nodes.

4. The system of claim 3, wherein the processor also:
generates an analysis for the one or more paths created by the one or more second nodes.

5. The system of claim 3, wherein the processor also:
generates an analysis for the one or more paths created by the one or more second nodes; and
generates a first sentence based on connection relationships of the first node, the one or more second nodes and the one or more paths.

6. The system of claim 1, wherein the processor also:
generates a first sentence, that upon processing, results in accessing at least one of the one or more second nodes.

7. The system of claim 1, wherein the processor also receives a second conversation.

8. The system of claim 1, wherein the processor also:
provides an indication that a conversation processing model requires an adjustment if processing of the first conversation does not access any nodes associated with the conversation processing model.

9. A computer implemented method, comprising:
receiving and processing, by a conversation processing component operatively coupled to a processor, a first conversation;
tagging, by a node marking component operatively coupled to the processor, a first node as an accessed node if the first node was accessed during processing of the first conversation; and
generating, by a reporting component operatively coupled to the processor, a report comprising a list of nodes, wherein the list of nodes comprises one or more second nodes that were not accessed during processing of the first conversation.

10. The computer implemented method of claim 9, wherein the report comprises an association of the first conversation with the list of nodes.

11. The computer implemented method of claim 9, wherein the report comprises one or more paths created by the one or more second nodes.

12. The computer implemented method of claim 11, further comprising:
generating, by a node path analyzer component operatively coupled to the processor, an analysis for the one or more paths created by the one or more second nodes.

13. The computer implemented method of claim 11, further comprising:
generating, by a node path analyzer component operatively coupled to the processor, an analysis for the one or more paths created by the one or more second nodes; and
generating, by a sentence recommending component operatively coupled to the processor, a first sentence based on connection relationships of the first node, the one or more second nodes and the one or more paths.

14. The computer implemented method of claim 9, further comprising:
generating, by a sentence recommending component operatively coupled to the processor, a first sentence that, upon processing, results in accessing at least one of the one or more second nodes.

15. The computer implemented method of claim 9, further comprising:
providing, by a model adjustment component operatively coupled to the processor, an indication that a conversation processing model requires an adjustment if processing of the first conversation does not access any nodes associated with the conversation processing model.

16. A computer program product for enhancing test coverage of dialogue models, the computer program product comprising a computer readable storage medium having program instructions embodied therewith, the program instructions executable by a processor to cause the processor to:
receive and process, by the processor, a first conversation;
tag, by the processor, a first node as an accessed node if the first node was accessed during processing of the first conversation; and
generate, by the processor, a report comprising a list of nodes, wherein the list of nodes comprises one or more second nodes that were not accessed during processing of the first conversation.

17. The computer program product of claim 16, wherein the program instructions are further executable by the processor to cause the processor to:
generate, by the processor, one or more paths created by the one or more second nodes.

18. The computer program product of claim 17, wherein the program instructions are further executable by the processor to cause the processor to:
generate, by the processor, an analysis for the one or more paths created by the one or more second nodes.

19. The computer program product of claim 17, wherein the program instructions are further executable by the processor to cause the processor to:
generate, by the processor, an analysis for the one or more paths created by the one or more second nodes; and
generate, by the processor, a first sentence based on connection relationships of the first node, the one or more second nodes and the one or more paths.

20. The computer program product of claim 16, wherein the program instructions are further executable by the processor to cause the processor to:
provide, by the processor, an indication that a conversation processing model requires an adjustment if processing of the first conversation does not access any nodes associated with the conversation processing model.

* * * * *